US012591186B2

(12) United States Patent
Hozono

(10) Patent No.: US 12,591,186 B2
(45) Date of Patent: Mar. 31, 2026

(54) IMAGE FORMING APPARATUS HAVING OPTICAL SCANNING UNIT WITH WIRE HARNESS AND CONNECTOR

(71) Applicant: KYOCERA Document Solutions Inc., Osaka (JP)

(72) Inventor: Tomohide Hozono, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/014,841

(22) Filed: Jan. 9, 2025

(65) Prior Publication Data

US 2025/0237992 A1    Jul. 24, 2025

(30) Foreign Application Priority Data

Jan. 23, 2024    (JP) ................................. 2024-007992

(51) Int. Cl.
*G03G 15/04*        (2006.01)
*B41J 2/00*          (2006.01)
(Continued)

(52) U.S. Cl.
CPC ........ *G03G 15/04072* (2013.01); *B41J 2/471* (2013.01); *G03G 15/80* (2013.01);
(Continued)

(58) Field of Classification Search
CPC ....... G03G 15/04072; G03G 15/04036; G03G 15/80; G03G 21/1633; G03G 21/1652; G03G 21/1666; G03G 2215/0404; G03G 2215/0402; G03G 2221/1636; G03G 2221/166; B41J 2/471; G06K 15/1204; H04N 1/00519; H04N 1/0053; H04N 1/00907
(Continued)

(56) References Cited

U.S. PATENT DOCUMENTS

2011/0235142 A1*    9/2011    Kusuda ..................... B41J 29/02
                                                                359/197.1
2011/0242621 A1*  10/2011    Takeuchi ........... H04N 1/00588
                                                                358/498
(Continued)

FOREIGN PATENT DOCUMENTS

JP          2008268348 A      11/2008

*Primary Examiner* — Robert B Beatty
(74) *Attorney, Agent, or Firm* — Alleman Hall LLP

(57)                        ABSTRACT

A cover closes a first opening of a main box portion. A second opening is formed in a unit housing of an optical scanning unit to externally expose a connector mounted on an electronic board. The unit housing has a protruding inner frame portion and a wiring portion. The protruding inner frame portion protrudes from an outer surface of the unit housing and surrounds the second opening. The cover includes a protruding outer frame portion that protrudes from an inner surface of the cover and surrounds the protruding inner frame portion. A top portion of the protruding inner frame portion is formed along an inner-side portion of the protruding outer frame portion on an inner surface of the cover. A top portion of the protruding outer frame portion is formed along an outer-side portion of the protruding inner frame portion on the outer surface of the unit housing.

6 Claims, 8 Drawing Sheets

(51) Int. Cl.

| | |
|---|---|
| *B41J 2/47* | (2006.01) |
| *G03G 15/00* | (2006.01) |
| *G03G 21/00* | (2006.01) |
| *G03G 21/16* | (2006.01) |
| *G06K 15/00* | (2006.01) |
| *G06K 15/12* | (2006.01) |
| *H04N 1/00* | (2006.01) |

(52) U.S. Cl.
CPC ..... *G03G 21/1652* (2013.01); *G06K 15/1204* (2013.01); *H04N 1/00519* (2013.01); *H04N 1/0053* (2013.01); *H04N 1/00907* (2013.01); *G03G 2221/1636* (2013.01); *G03G 2221/166* (2013.01)

(58) Field of Classification Search
USPC .......... 399/90, 118; 347/138, 152, 245, 263
See application file for complete search history.

(56) References Cited

U.S. PATENT DOCUMENTS

| | | | | |
|---|---|---|---|---|
| 2015/0212477 | A1* | 7/2015 | Ishidate ................. | G03G 15/80 |
| | | | | 347/118 |
| 2016/0207328 | A1* | 7/2016 | Otoguro ................... | B41J 2/471 |
| 2017/0242390 | A1* | 8/2017 | Miyakoshi ............. | G03G 15/80 |
| 2020/0310337 | A1* | 10/2020 | Nguyen ........... | G03G 15/04072 |
| 2020/0322488 | A1* | 10/2020 | Takahashi ................ | H04N 1/04 |

* cited by examiner

IMAGE FORMING APPARATUS HAVING OPTICAL SCANNING UNIT WITH WIRE HARNESS AND CONNECTOR

INCORPORATION BY REFERENCE

This application is based upon and claims the benefit of priority from the corresponding Japanese Patent Application No. 2024-007992 filed on Jan. 23, 2024, the entire contents of which are incorporated herein by reference.

BACKGROUND

The present disclosure relates to an image forming apparatus including an optical scanning unit.

An electrophotographic image forming apparatus includes an optical scanning unit that forms an electrostatic latent image on a surface of a photoconductor. The optical scanning unit includes an optical scanner such as a polygon mirror and other optical devices. Therefore, it is important to take measures to prevent dust from entering the optical scanning unit.

For example, it is known that a gap between a main housing and a cover portion of an optical box of the optical scanning unit is sealed with an elastic member.

SUMMARY

An image forming apparatus according to one aspect of the present disclosure includes a main housing, an optical scanning unit, and a wire harness. The main housing includes a main box portion having a first opening formed therein, and a cover portion attached to the main box portion and closing the first opening. The optical scanning unit includes an optical scanner, an electronic board on which circuitry for driving the optical scanner and a connector are mounted, and a unit housing that houses the optical scanner and the electronic board and has a second opening that externally exposes the connector, the optical scanning unit being housed within the main box portion. The wire harness is connected to the connector of the electronic board and is wired inside the main box portion. The unit housing includes a protruding inner frame portion and a wiring portion. The protruding inner frame portion protrudes from an outer surface of the unit housing and surrounds the second opening. The wiring portion forms a lead-out path for the wire harness that extends from inside to outside of the protruding inner frame portion. The cover portion includes a protruding outer frame portion that protrudes from an inner surface of the cover portion and surrounds the protruding inner frame portion. A top portion of the protruding inner frame portion is formed along an inner-side portion of the protruding outer frame portion on an inner surface of the cover portion A top portion of the protruding outer frame portion is formed along an outer-side portion of the protruding inner frame portion on the outer surface of the unit housing.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments according to the present disclosure will be described with reference to the drawings. Note that the following embodiments are examples according to the present disclosure and do not limit the technical scope according to the present disclosure.

An image forming apparatus 10 according to an embodiment executes a printing process using and electrophotographic method. The printing process is a process for forming an image on a sheet 9. The sheet 9 is an image forming medium such as paper or a sheet-like resin member.

Figure 1:
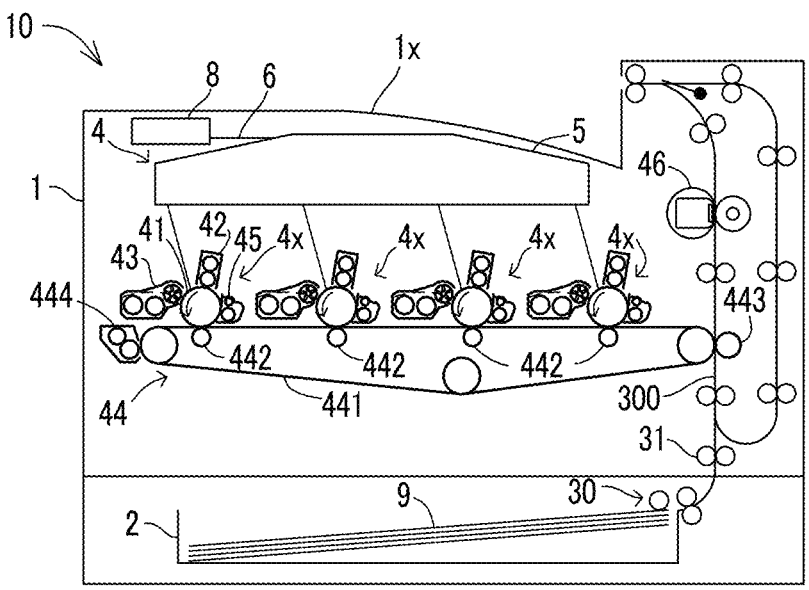
FIG. 1 is a diagram showing a configuration of an image forming apparatus according to an embodiment.

The image forming apparatus 10 shown in FIG. 1 is a printer. The image forming apparatus 10 may be a copier, a facsimile machine, a multifunction peripheral, or the like. [Configuration of Image Forming Apparatus 10]

As shown in FIG. 1, the image forming apparatus 10 includes a main housing 1, a sheet conveying device 3, a printing device 4, and a control device 8 housed within the main housing 1.

The sheet conveying device 3 includes a sheet feeding mechanism 30 and a plurality of sets of conveying roller pairs 31. The sheet feeding mechanism 30 feeds out a sheet 9 stored in a sheet storing portion 2 to a conveying path 300. The conveying path 300 is a path along which the sheet 9 is conveyed.

The plurality of sets of conveying roller pairs 31 convey the sheet 9 along the conveying path 300 by rotating. Furthermore, the plurality of sets of conveying roller pairs 31 discharge the sheet 9 on which an image has been formed in the conveying path 300 onto a discharge tray 1x.

The printing device 4 includes an optical scanning unit 5, one or more image forming portions 4x, a transfer device 44, and a fixing device 46.

In the present embodiment, the image forming apparatus 10 includes a tandem printing device 4. Therefore, the printing device 4 includes a plurality of image forming portions 4x corresponding to a plurality of developing colors.

Each image forming portion 4x includes a drum-shaped photoconductor 41, a charging device 42, a developing device 43, a drum cleaning device 45, and the like. That is, the printing device 4 includes a plurality of photoconductors 41, a plurality of developing devices 43, and a plurality of drum cleaning devices 45 corresponding to a plurality of developing colors.

In each of the image forming portions 4x, the photoconductor 41 rotates, and the charging device 42 charges the surface of the photoconductor 41. The optical scanning unit 5 scans the surfaces of the plurality of charged photoconductors 41 with a plurality of laser beams. Thus, the optical scanning unit 5 forms an electrostatic latent image on the surface of each of the plurality of photoconductors 41.

The plurality of developing devices 43, by respectively supplying toner to the surfaces of the plurality of photoconductors 41, develop the electrostatic latent images into toner images. The toner is a granular developing agent. The photoconductor 41 is an example of an image-carrying member that rotates while carrying a toner image.

In the present embodiment, the printing device 4 includes four image forming portions 4x corresponding to the toners of the four developing colors, yellow, cyan, magenta and black. Therefore, the printing device 4 includes four photoconductors 41, four developing devices 43, and four drum cleaning devices 45.

The four toner images are formed on the surfaces of the four photoconductors 41. The transfer device 44 transfers the four toner images from the four photoconductors 41 to the sheet 9.

The transfer device 44 includes an intermediate transfer belt 441, four primary transfer devices 442 corresponding to the four image forming portions 4x, a secondary transfer device 443, and a belt cleaning device 444.

The four primary transfer devices 442 transfer the toner images on the surfaces of the four photoconductors 41 onto the surface of the intermediate transfer belt 441. Thus, a color toner image, which is a composite of the toner images on the four photoconductors 41, is formed on the surface of the intermediate transfer belt 441.

The secondary transfer device 443 transfers the color toner image formed on the intermediate transfer belt 441 onto the sheet 9 at a transfer position on the conveying path 300.

The fixing device 46 applies heat and pressure to the color toner image transferred onto the sheet 9. Thus, the fixing device 46 fixes the color toner image onto the sheet 9.

Each drum cleaning device 45 removes waste toner remaining on the surface of each photoconductor 41. The belt cleaning device 444 removes the waste toner remaining on the intermediate transfer belt 441.

Note that in a case in which the image forming apparatus 10 is a monochrome image forming apparatus, the printing device 4 has one image forming portion 4x. In this case, the primary transfer device 442 transfers the electrostatic latent image from the photoconductor 41 to the sheet 9.

Figure 2:
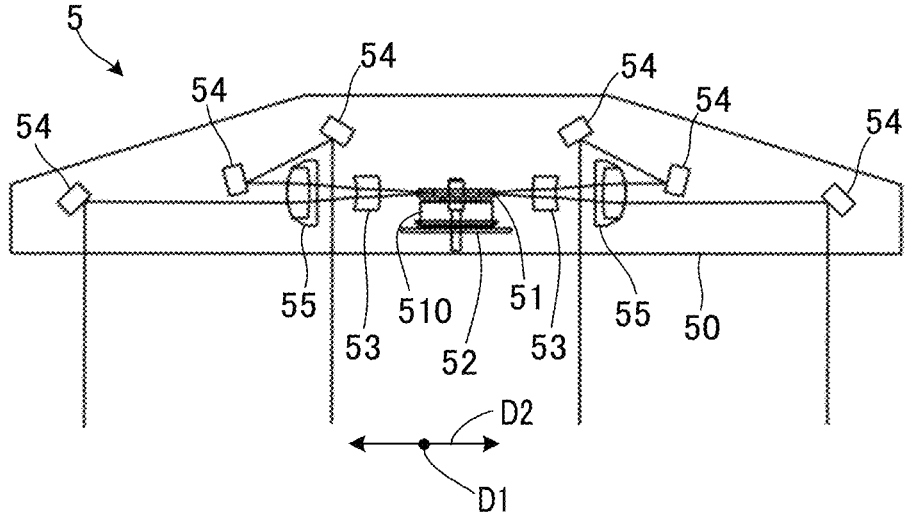
FIG. 2 is a configuration diagram of an optical scanning unit in an image forming apparatus according to an embodiment.
Figure 3:
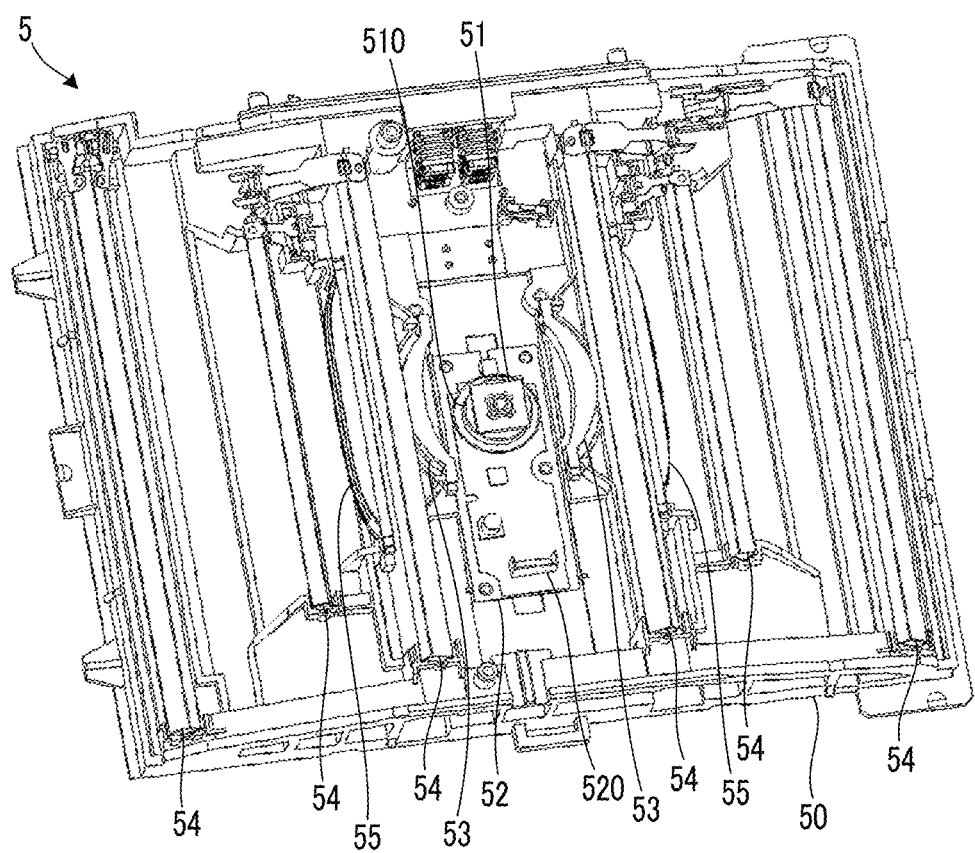
FIG. 3 is a perspective view of an inner portion of an optical scanning unit in an image forming apparatus according to an embodiment.

As shown in FIGS. 2 and 3, the optical scanning unit 5 includes a unit housing 50, a plurality of light sources (not shown), an optical scanner 51, an electronic board 52, one or more main lenses 53, a plurality of mirrors 54, and a plurality of secondary lenses 55.

The unit housing 50 is a molded member made of synthetic resin. The unit housing 50 houses the plurality of light sources, the optical scanner 51 and the electronic board 52.

Each of the plurality of light sources is a laser light source that emits a laser beam. The optical scanner 51 scans the plurality of laser beams emitted from the plurality of light sources.

In the present embodiment, the optical scanner 51 is a polygon mirror. The polygon mirror has a plurality of mirrors arranged in a regular polygon shape in the circumferential direction. The polygon mirror is rotated by being driven by a polygon motor 510 (see FIG. 2).

In addition, a galvanometer mirror or a micro electro mechanical systems mirror (MEMS mirror) may be adopted as the optical scanner 51.

The circuitry that drives the polygon motor 510 is implemented on the electronic board 52. That is, the circuitry for driving the optical scanner 51 is implemented on the electronic board 52. Each of the main lenses 53 and each of the secondary lenses 55 is an fθ lens.

One or more main lenses 53, a plurality of mirrors 54 and a plurality of secondary lenses 55 are arranged within the unit housing 50. The plurality of laser beams are transmitted through the main lens 53 and the plurality of secondary lenses 55 and are reflected by the plurality of mirrors 54, and then scanned onto the surfaces of the plurality of photoconductors 41.

The control device 8 controls the sheet conveying device 3 and the printing device 4. For example, the control device 8 controls the formation of the electrostatic latent images on the surfaces of the plurality of photoconductors 41 by controlling the plurality of light sources and the polygon motor 510 in the optical scanning unit 5.

The optical scanning unit 5 includes optical devices such as the optical scanner 51, the main lens 53, and the plurality of mirrors 54. Therefore, measures to prevent dust from entering the optical scanning unit 5 are important.

The optical scanning unit 5 includes the electronic board 52 on which the circuitry for driving the optical scanner 51 is mounted. The electronic board 52 is connected to the control device 8 by a wire harness 6 (see FIGS. 1 and 6).

Therefore, in the optical scanning unit 5, measures for preventing dust are required for the wiring path of the wire harness 6. It is desirable to achieve a dustproof structure for the wiring path of the wire harness 6 with a simple structure.

Hereinafter, a configuration for simplifying the dustproof structure in the wiring path of the wire harness 6 connected to the electronic board 52 in the optical scanning unit 5 will be described.

The main housing 1 includes a main box portion 101 in which a first opening 101a is formed, and a cover portion 102 attached to the main box portion 101. The cover portion 102 is attached to the main box portion 101 to close the first opening 101a. The optical scanning unit 5 is housed inside the main box portion 101 (see FIG. 4).

Figure 4:
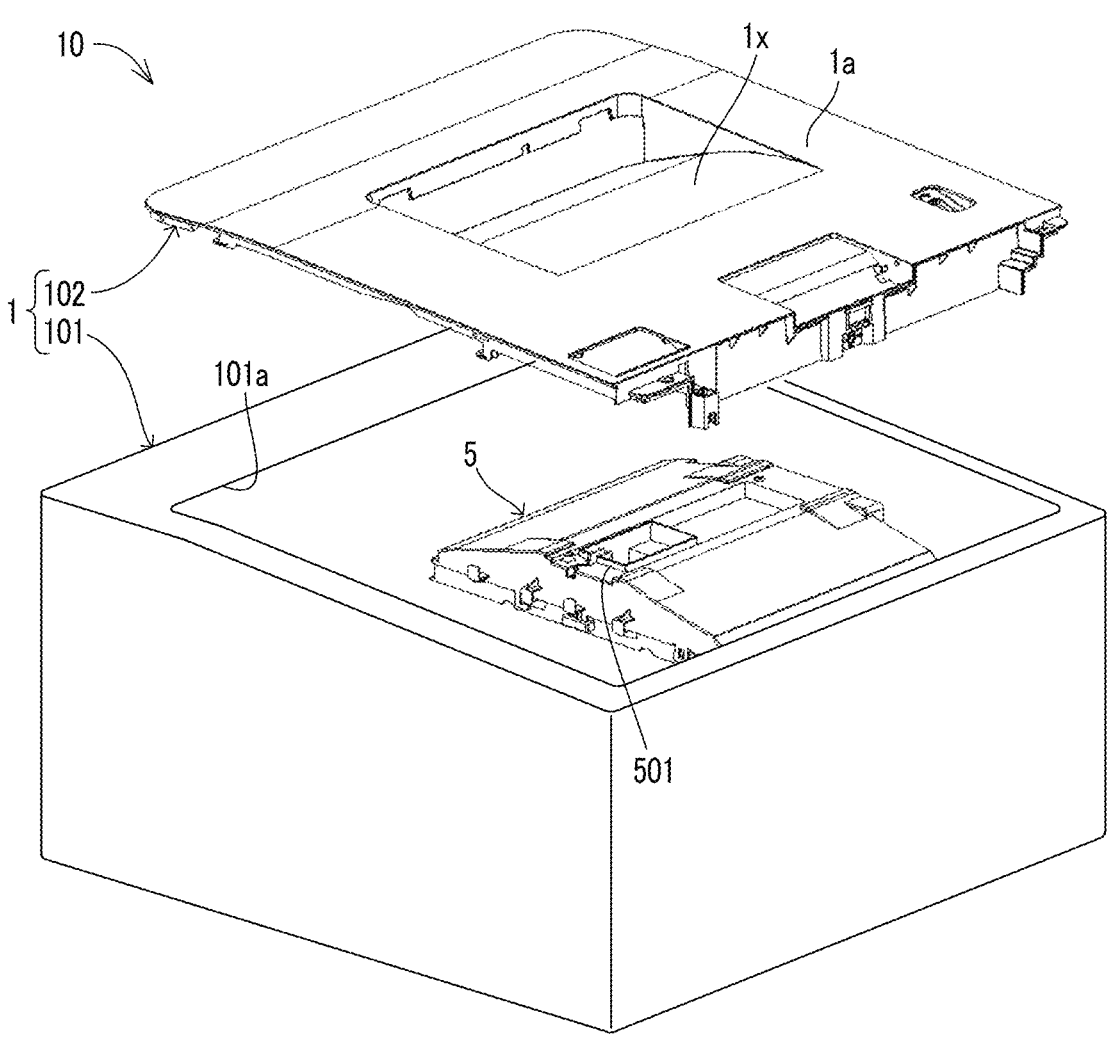
FIG. 4 is a perspective view of a main housing and an optical scanning unit from which an upper cover portion is removed in an image forming apparatus according to an embodiment.

In the present embodiment, the first opening 101a opens the main box portion 101 upward (see FIG. 4). The cover portion 102 includes a discharge tray 1x that receives the sheet 9 discharged from the main housing 1 (see FIG. 4). The discharge tray 1x is formed on an outer surface 102a of the cover portion 102.

Figure 5:
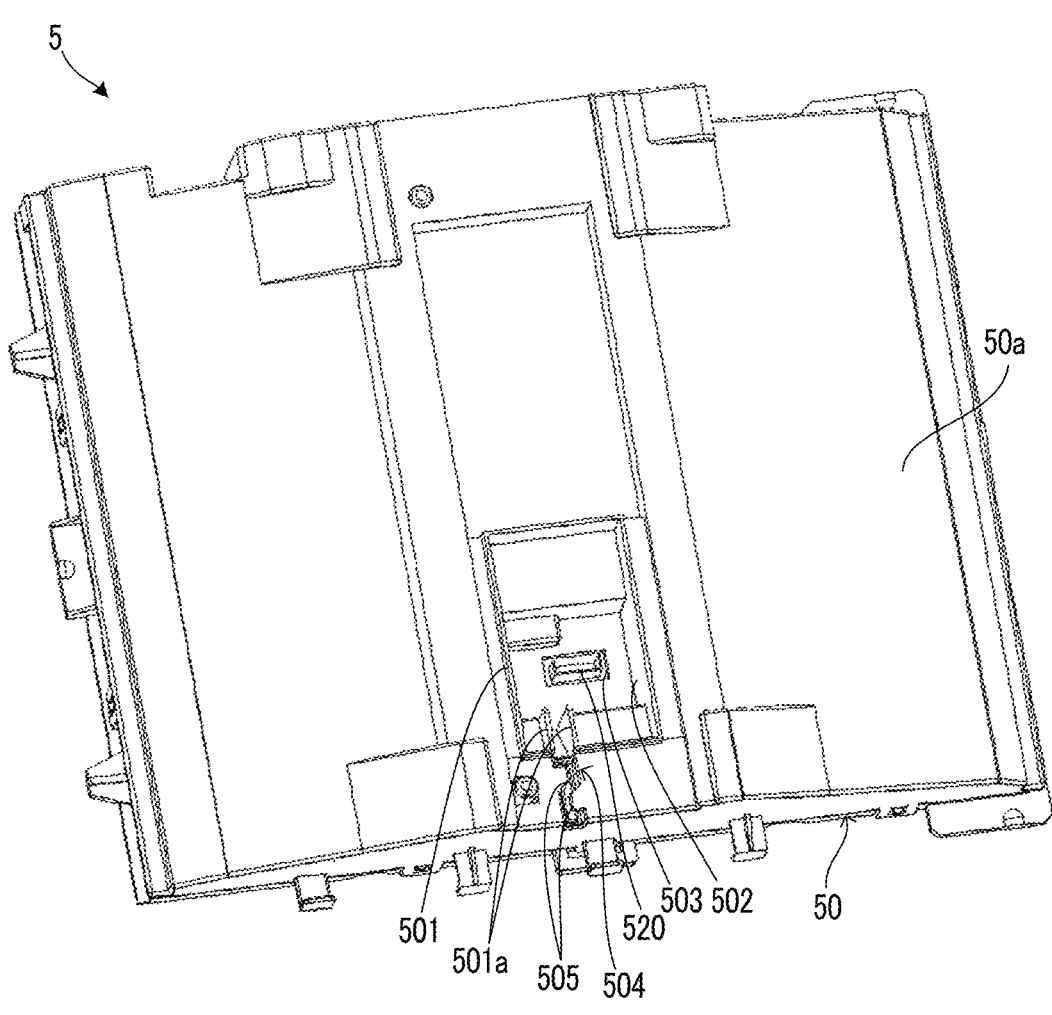
FIG. 5 is a perspective view of an optical scanning unit in an image forming apparatus according to an embodiment.
Figure 6:
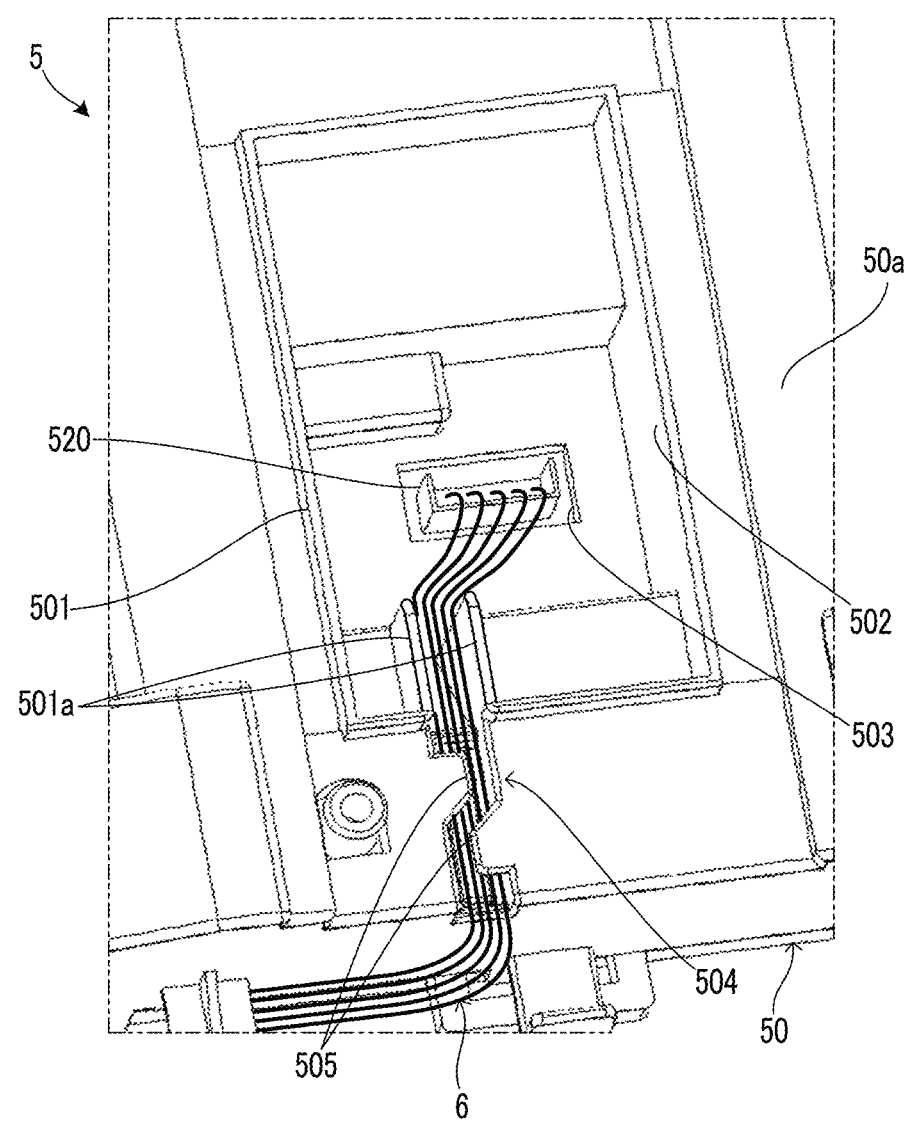
FIG. 6 is a perspective view of a surrounding portion of a connector of an optical scanning unit in an image forming apparatus according to an embodiment.
Figure 9:
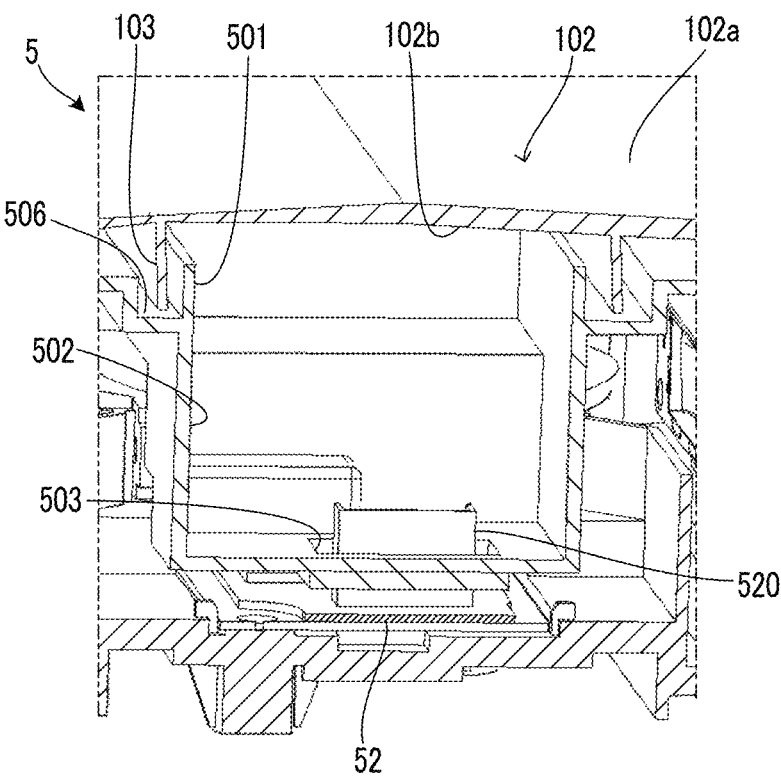
FIG. 9 is a perspective cross-sectional view of a surrounding portion of a connector of an optical scanning unit in an image forming apparatus according to an embodiment.

In the optical scanning unit 5, a connector 520 is mounted on the electronic board 52 (see FIGS. 5, 6 and 9). In addition, a second opening 503 is formed in the unit housing 50 to expose the connector to the outside of the unit housing 50 (see FIGS. 5, 6, 9 and 10).

In the present embodiment, the unit housing 50 further has an in-frame recessed portion 502 (see FIGS. 5 and 6). The in-frame recessed portion 502 is a portion on the outer surface of the unit housing 50 that is recessed more on the inside of a protruding inner frame portion 501 than a portion on the outside of the protruding inner frame portion 501.

The second opening 503 of the unit housing 50 is formed in a bottom surface of the in-frame recessed portion 502 (see FIGS. 5 and 6). The connector 520 of the electronic board 52 passes through the second opening 503 (see FIGS. 5, 6 and 9).

The wire harness 6 is connected to the connector 520 of the electronic board 52 and is wired inside the main box portion 101. In the present embodiment, the wire harness 6 is connected to the connector 520 of the electronic board 52 and the control device 8 inside the main box portion 101.

The unit housing 50 has the protruding inner frame portion 501 and a wiring portion 504 (see FIGS. 5, 6, 9, and 10). The protruding inner frame portion 501 protrudes from the outer surface of the unit housing 50 and surrounds the periphery of the second opening 503. The wiring portion 504 is a portion that forms a lead-out path for the wire harness 6 that extends from the inside to the outside of the protruding inner frame portion.

Figure 7:
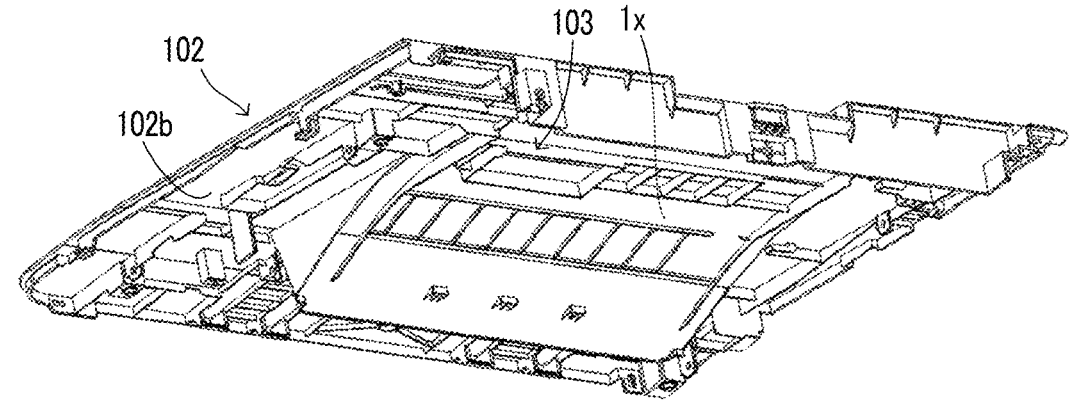
FIG. 7 is a perspective view of an upper cover portion of an image forming apparatus according to an embodiment.
Figure 8:
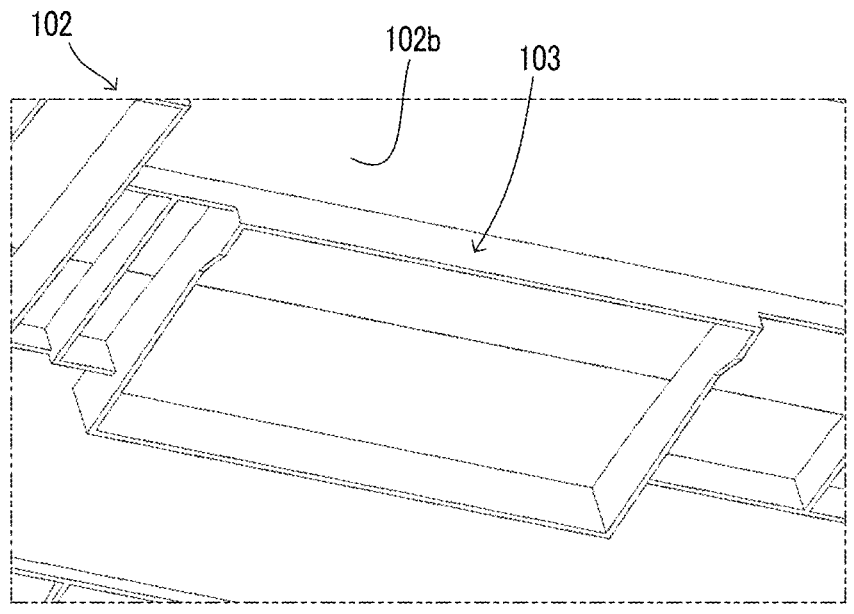
FIG. 8 is a perspective view of a protruding outer frame portion of an upper cover portion of an image forming apparatus according to an embodiment.

The cover portion 102 has a protruding outer frame portion 103 (see FIGS. 7 to 9). The protruding outer frame portion 103 protrudes from an inner surface 102b of the cover portion 102. In a state in which the cover portion 102 covers the first opening 101a of the main box portion 101, the protruding outer frame portion 103 surrounds the periphery of the protruding inner frame portion 501 of the unit housing 50 (see FIGS. 9 and 10).

The top portion of the protruding inner frame portion 501 is formed along an inner-side portion of the protruding outer frame portion 103 on the inner surface 102b of the cover portion 102 (see FIG. 9). The top portion of the protruding outer frame portion 103 is formed along an outer-side portion of the protruding inner frame portion 501 on the outer surface of the unit housing 50 (see FIG. 9).

In the example shown in FIG. 9, the outer surface of the unit housing 50 is formed with an outer frame recessed portion 506, which is a recessed portion into which the top portion of the protruding outer frame portion 103 is inserted.

In the present embodiment, the wiring portion 504 is in the form of a groove that is recessed more than an outer-side portion of the protruding inner frame portion 501 on the outer surface of the unit housing 50 (see FIG. 6). Thus, the top portion of the protruding outer frame portion 103 is arranged across a pair of edges of the groove-shaped wiring portion 504.

Figure 10:
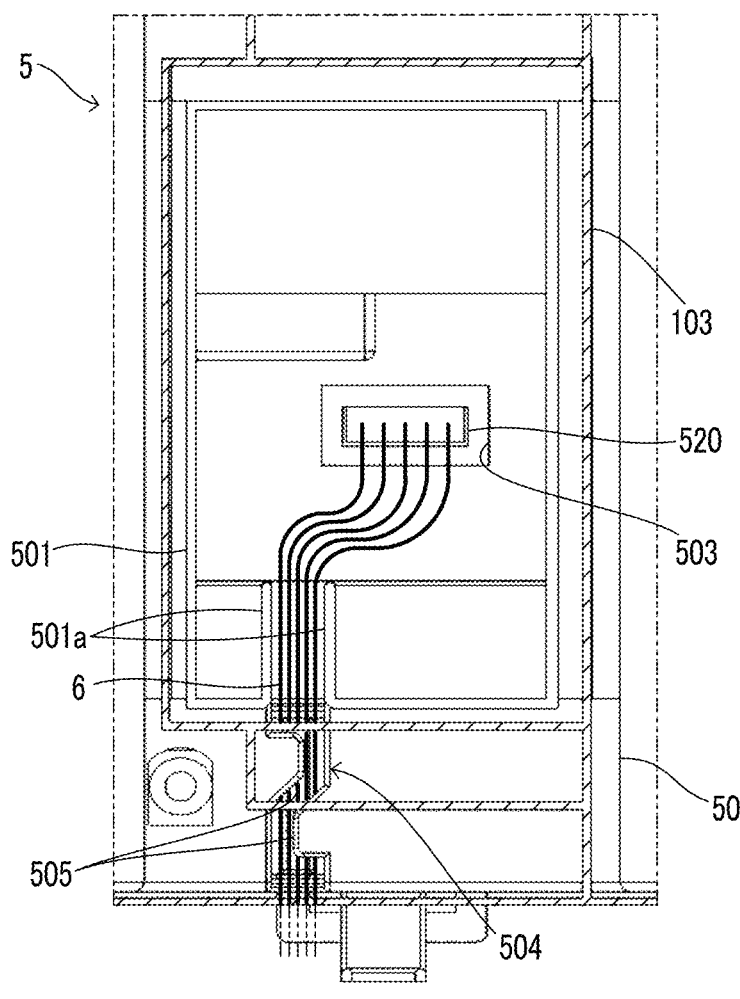
FIG. 10 is a plan cross-sectional view of a surrounding portion of a connector of an optical scanning unit in an image forming apparatus according to an embodiment.

A pair of opposing walls 501a that are part of the protruding inner frame portion 501 are formed along a pair of edges of the groove-shaped wiring portion 504 (see FIGS. 6 and 10).

The unit housing 50 further includes detachment prevention portions 505 that prevent the wire harness 6 from detaching from the wiring portion 504 (see FIGS. 5, 6 and 10). The detachment prevention portions 505 are formed so as to protrude onto the wiring portion 504 from a pair of edges of the groove-shaped wiring portion 504.

By employing the protruding inner frame portion 501 and the protruding outer frame portion 103, the air passage from an outside area of the protruding outer frame portion 103 within the main housing 1 to an inside area of the protruding inner frame portion 501 including the second opening 503 is narrowed. As a result, the dust-proofing effect of the unit housing 50 is improved.

By employing the in-frame recessed portion 502, the bottom surface of the frame recess 502 is arranged close to the electronic board 52, and a gap connecting the inside and outside of the unit housing 50 through the second opening 503 is narrowed. As a result, the dust-proofing effect of the unit housing 50 is further improved.

Note that the protruding inner frame portion 501 is not in contact with the cover portion 102. Similarly, the protruding outer frame portion 103 is not in contact with the unit housing 50. Therefore, the vibration of the cover portion 102 when the sheet 9 is discharged onto the discharge tray 1x is not directly transmitted to the optical scanning unit 5.

By employing the optical scanning unit 5 and the cover portion 102, a dustproof structure for the wiring path of the wire harness 6 can be achieved without using an elastic member such as a rubber member or a foam member. Therefore, the dustproof structure of the wiring path of the wire harness 6 is simplified.

[Supplementary Notes]

An outline of the invention extracted from the above-described embodiments will be added below. Note that the configurations and processing functions described in the following supplementary notes can be selected and combined as desired.

<Supplementary Note 1>

An image forming apparatus, including:

a main housing that includes a main box portion in which a first opening is formed and a cover portion attached to the main box portion and covering the first opening;

an optical scanning unit that includes an optical scanner, an electronic board on which circuitry for driving the optical scanner and a connector are mounted, and a unit housing that houses the optical scanner and the electronic board and has a second opening that externally exposes the connector, the optical scanning unit being housed within the main box portion; and a wire harness connected to the connector of the electronic board and wired within the main box portion; wherein the unit housing includes:

a protruding inner frame portion configured to protrude from an outer surface of the unit housing and surround the second opening; and a wiring portion configured to form a lead-out path of the wire harness extending from inside to outside of the protruding inner frame portion;

the cover portion includes a protruding outer frame portion configured to protrude from an inner surface of the cover portion and surround the protruding inner frame portion;

a top portion of the protruding inner frame portion is formed along an inner-side portion of the protruding outer frame portion on an inner surface of the cover portion; and a top portion of the protruding outer frame portion is formed along an outer-side portion of the protruding inner frame portion on the outer surface of the unit housing.

<Supplementary Note 2>

The image forming apparatus according to supplementary note 1; wherein the wiring portion is in the form of a groove recessed more than the outer-side portion of the protruding inner frame portion on the outer surface of the unit housing.

<Supplementary Note 3>

The image forming apparatus according to supplementary note 2; wherein the unit housing includes a detachment prevention portion configured to protrude onto the wiring portion from a pair of edges of the groove-shaped wiring portion and prevent the wire harness from detaching from the wiring portion.

<Supplementary Note 4>

The image forming apparatus according to supplementary note 2 or 3; wherein a part of the protruding inner frame portion is formed along a pair of edges of the groove-shaped wiring portion.

<Supplementary Note 5>

The image forming apparatus according to any one of supplementary notes 1 to 4; wherein the unit housing includes an in-frame recessed portion that is recessed inside the protruding inner frame portion on the outer surface of the unit housing more than an outer-side portion of the protruding inner frame portion;

the second opening is formed in a bottom surface of the in-frame recessed portion; and the connector of the electronic board passes through the second opening.

<Supplementary Note 6>

The image forming apparatus according to any one of supplementary notes 1 to 5; wherein the cover portion includes a discharge tray configured to receive sheets discharged from the main housing.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

a main housing that includes a main box portion in which a first opening is formed and a cover portion attached to the main box portion and covering the first opening;

an optical scanning unit that includes an optical scanner, an electronic board on which circuitry for driving the optical scanner and a connector are mounted, and a unit housing that houses the optical scanner and the electronic board and has a second opening that externally exposes the connector, the optical scanning unit being housed within the main box portion; and a wire harness connected to the connector of the electronic board and wired within the main box portion; wherein the unit housing includes:

a protruding inner frame portion configured to protrude from an outer surface of the unit housing and surround the second opening; and a wiring portion configured to form a lead-out path of the wire harness extending from inside to outside of the protruding inner frame portion;

the cover portion includes a protruding outer frame portion configured to protrude from an inner surface of the cover portion and surround the protruding inner frame portion;

a top portion of the protruding inner frame portion is formed along an inner-side portion of the protruding outer frame portion on an inner surface of the cover portion; and a top portion of the protruding outer frame portion is formed along an outer-side portion of the protruding inner frame portion on the outer surface of the unit housing.

2. The image forming apparatus according to claim 1, wherein the wiring portion is in the form of a groove recessed more than the outer-side portion of the protruding inner frame portion on the outer surface of the unit housing.

3. The image forming apparatus according to claim 2, wherein the unit housing includes a detachment prevention portion configured to protrude onto the wiring portion from a pair of edges of the groove-shaped wiring portion and prevent the wire harness from detaching from the wiring portion.

4. The image forming apparatus according to claim 2, wherein a part of the protruding inner frame portion is formed along a pair of edges of the groove-shaped wiring portion.

5. The image forming apparatus according to claim 1, wherein the unit housing includes an in-frame recessed portion that is recessed inside the protruding inner frame portion on the outer surface of the unit housing more than an outer-side portion of the protruding inner frame portion;

the second opening is formed in a bottom surface of the in-frame recessed portion; and the connector of the electronic board passes through the second opening.

6. The image forming apparatus according to claim 1, wherein the cover portion includes a discharge tray configured to receive sheets discharged from the main housing.

* * * * *